US010627655B2

(12) United States Patent
Huang et al.

(10) Patent No.: US 10,627,655 B2
(45) Date of Patent: Apr. 21, 2020

(54) MONOLITHIC ELECTRO-OPTICAL MODULATOR HAVING SUSPENDED STRUCTURE

(71) Applicant: SiFotonics Technologies Co., Ltd., Grand Cayman (KY)

(72) Inventors: Mengyuan Huang, Redmond, WA (US); Yadong Liu, Beijing (CN); Tzung-I Su, Taoyuan (TW); Pengfei Cai, Beijing (CN); Ching-yin Hong, Lexington, MA (US); Dong Pan, Andover, MA (US)

(73) Assignee: SIFOTONICS TECHNOLOGIES CO., LTD., Grand Cayman (KY)

( * ) Notice: Subject to any disclaimer, the term of this patent is extended or adjusted under 35 U.S.C. 154(b) by 0 days.

(21) Appl. No.: 16/370,821

(22) Filed: Mar. 29, 2019

(65) Prior Publication Data

US 2019/0302487 A1 Oct. 3, 2019

Related U.S. Application Data

(60) Provisional application No. 62/761,584, filed on Mar. 29, 2018.

(51) Int. Cl.
*G02F 1/025* (2006.01)

(52) U.S. Cl.
CPC ........ *G02F 1/025* (2013.01); *G02F 2202/105* (2013.01); *G02F 2203/50* (2013.01)

(58) Field of Classification Search
CPC . G02F 1/025; G02F 2202/105; G02F 2203/50
See application file for complete search history.

(56) References Cited

U.S. PATENT DOCUMENTS

| 6,847,750 B1* | 1/2005 | Baumann | G02F 1/011 |
| | | | 385/129 |
| 9,059,252 B1* | 6/2015 | Liu | H01L 21/7682 |
| 10,416,380 B1* | 9/2019 | Chen | G02B 6/132 |
| 2005/0089257 A1* | 4/2005 | Barrios | G02F 1/025 |
| | | | 385/2 |
| 2005/0169566 A1* | 8/2005 | Takahashi | G02F 1/011 |
| | | | 385/1 |
| 2009/0297092 A1* | 12/2009 | Takahashi | G02F 1/0147 |
| | | | 385/14 |
| 2012/0189239 A1* | 7/2012 | Tu | G02F 1/025 |
| | | | 385/2 |
| 2017/0075148 A1* | 3/2017 | Baudot | G02F 1/025 |

* cited by examiner

*Primary Examiner* — Sung H Pak
(74) *Attorney, Agent, or Firm* — Han IP PLLC; Andy M. Han

(57) ABSTRACT

Various embodiments of a monolithic electro-optical (E-O) modulator are described herein. The monolithic E-O modulator may include a phase shifter having a suspended structure. The suspended structure may be realized by partially or completely removing silicon material underneath the active area of the phase shifter to form a void in the bulk silicon substrate supporting the phase shifter. The suspended structure may be utilized to result in a lower radio-frequency loss and an effective group refractive index of the phase shifter that is closer to the refractive index of silicon waveguides or optical fibers, both advantageous to enhancing the performance of the E-O modulator such as a higher operating bandwidth.

20 Claims, 11 Drawing Sheets

MONOLITHIC ELECTRO-OPTICAL MODULATOR HAVING SUSPENDED STRUCTURE

CROSS-REFERENCE TO RELATED PATENT APPLICATIONS

The present disclosure claims the priority benefit of U.S. Patent Application No. 62/761,584, filed on Mar. 29, 2018. The aforementioned application is incorporated by reference in its entirety.

TECHNICAL FIELD

The present disclosure relates to a photonic integrated circuit (PIC). More particularly, the present disclosure relates to a monolithic electro-optical modulator having one or more suspended structures.

BACKGROUND

Photonic integrated circuits and systems, commonly referred as "integrated photonics", involve fabricating both optical devices and electrical devices on a same substrate, usually a semiconductor substrate such as silicon (Si) or silicon-on-insulator (SOI) substrate. Using semiconductor fabrication techniques similar to those employed in manufacturing integrated circuits (ICs), one is able to integrate, on a same semiconductor substrate, miniaturized optical components together with electrical components, thereby performing signal processing or other circuit functions in both optical and electrical domains. Since a PIC is usually fabricated on a single substrate, it is sometimes referred as a "monolithic electro-optical (E-O) system" or a "monolithic E-O circuit". The E-O components employed by a PIC fabricated on a substrate are thus often referred as "monolithic E-O components".

A monolithic E-O modulator, such as a Mach-Zehnder modulator (MZM), is a PIC often employed by various digital communication systems. Miniaturized optical components (such as waveguides, optical couplers, optical splitters, phase shifters, and the like) may be integrated with miniaturized electrical components (such as resistors, capacitors, diodes, electrodes, and the like) to realize a monolithic MZM. Specifically, a monolithic MZM may include, among other components, one or more phase shifters. A phase shifter is a component that introduces a certain amount of phase shift to the optical wave passing through the phase shifter. The amount of phase shift induced therein depends on a controlling or modulating voltage (i.e., the "signal") applied to the phase shifter.

Monolithic phase shifters, as conventionally built, face several practical challenges related to signal loss, especially for high-speed applications. That is, for a conventional phase shifter, a high-frequency modulating voltage is not able to effectively modulate the optical wave by changing its phase, resulting in a loss of the modulating signal in the optical wave. In certain scenarios, the signal loss at a phase shifter may be so significant that the phase shifter becomes inefficient, even to the point of not being able to perform its designed function. This in turn negatively affects the performance of the E-O modulator using the phase shifter.

SUMMARY

This section highlights certain features of the inventive concept of the present disclosure, and in no way is to be interpreted as limiting the scope of the claimed subject matter as well as any deviations and derivatives thereof.

In one aspect, a monolithic phase shifter may include the following: a silicon-on-insulator (SOI) substrate comprising a bulk silicon substrate, a buried oxide (BOX) layer disposed on top of the bulk silicon substrate, and a top silicon layer disposed on top of the BOX layer; a N type doped region formed in the top silicon layer; a P type doped region formed in the top silicon layer, the P type doped region disposed adjacent to the N type doped region along a main propagation direction of the monolithic phase shifter; a N+ doped region formed in the top silicon layer, the N+ doped region disposed adjacent to the N type doped region and opposing the P type doped silicon region; a P+ doped region formed in the top silicon layer, the P+ doped region disposed adjacent to the P type doped region and opposing the N type doped silicon region; a N++ doped region formed in the top silicon layer, the N++ doped region disposed adjacent to the N+ doped region and opposing the N type doped silicon region; a P++ doped region formed in the top silicon layer, the P++ doped region disposed adjacent to the P+ doped region and opposing the P type doped silicon region; and a void formed in the bulk silicon substrate, the void adjacent to a surface of the BOX layer away from the top silicon layer and opposing an aggregated area in the top silicon layer, the aggregated area encompassing at least a portion of the N type doped region, a portion of the N type doped region, a portion of the N+ doped region, a portion of the P+ doped region, a portion of the N++ doped region or a portion of the P++ doped region.

In another aspect, an electro-optical (E-O) modulator may include the following: an input optical splitter configured to split an input signal into a first branch signal and a second branch signal; a first phase shifting (PS) branch comprising two or more monolithic phase shifters connected in series, the first PS branch configured to receive the first branch signal as an input and emits a first shifted signal as an output; a second phase shifting (PS) branch comprising two or more monolithic phase shifters connected in series, the second PS branch configured to receive the second branch signal as an input and emits a second shifted signal as an output; an output optical splitter configured to combine the first and second shifted signals into an output signal. Specifically, each of the first and second PS branches further comprises a coplanar waveguide (CPW) configured to receive a respective electrical voltage as a modulation signal. In addition, at least one monolithic phase shifter of the two or more monolithic phase shifters of the first or second PS branch comprises a suspended structure. Moreover, the suspended structure comprises a void formed in a bulk silicon substrate of a silicon-on-insulator (SOI) substrate carrying the at least one monolithic phase shifter.

BRIEF DESCRIPTION OF THE DRAWINGS

The accompanying drawings are included to provide a further understanding of the present disclosure, and are incorporated in and constitute a part of this specification. The drawings illustrate embodiments of the present disclosure and, together with the description, serve to explain the principles of the present disclosure. The drawings may not necessarily be in scale so as to better present certain features of the illustrated subject matter. The left-most digit(s) of a reference number identifies the figure in which the reference number first appears. The use of the same reference numbers in different figures indicates similar or identical items.

DETAILED DESCRIPTION OF THE PREFERRED EMBODIMENTS

As described above, a conventional monolithic phase shifter suffers from significant signal loss at high frequency. Specifically, the continuous wave (CW) optical wave that passes through the phase shifter does not respond well to a high-frequency electrical signal (i.e., a voltage) that modulates the optical wave by changing the phase of the optical wave. Hence, the modulation signal cannot be faithfully carried in the CW optical wave. The signal loss is generally more eminent when the frequency of the modulation voltage is higher. This signal loss is sometimes referred as microwave loss or radio-frequency (RF) loss because the signal loss usually becomes non-negligible when the signal frequency is in microwave or RF range. For example, for high speed communication using a high-speed modulation signal of 25 Gb/s or beyond, the phase shifter may become so inefficient that a MZM employing such a phase shifter would no longer function as desired, thereby limiting the operating bandwidth of the MZM.

The present disclosure advocates a phase shifter having a novel suspended structure. Thanks to the suspended structure embedded in the phase shifter, the RF loss of the phase shifter is mitigated and reduced. The present disclosure also advocates a monolithic electro-optical modulator employing one or more phase shifters that have the suspended structure. The novel phase shifter and the novel electro-optical modulator are presented using the following example embodiments.

Example Embodiments

Figure 1:
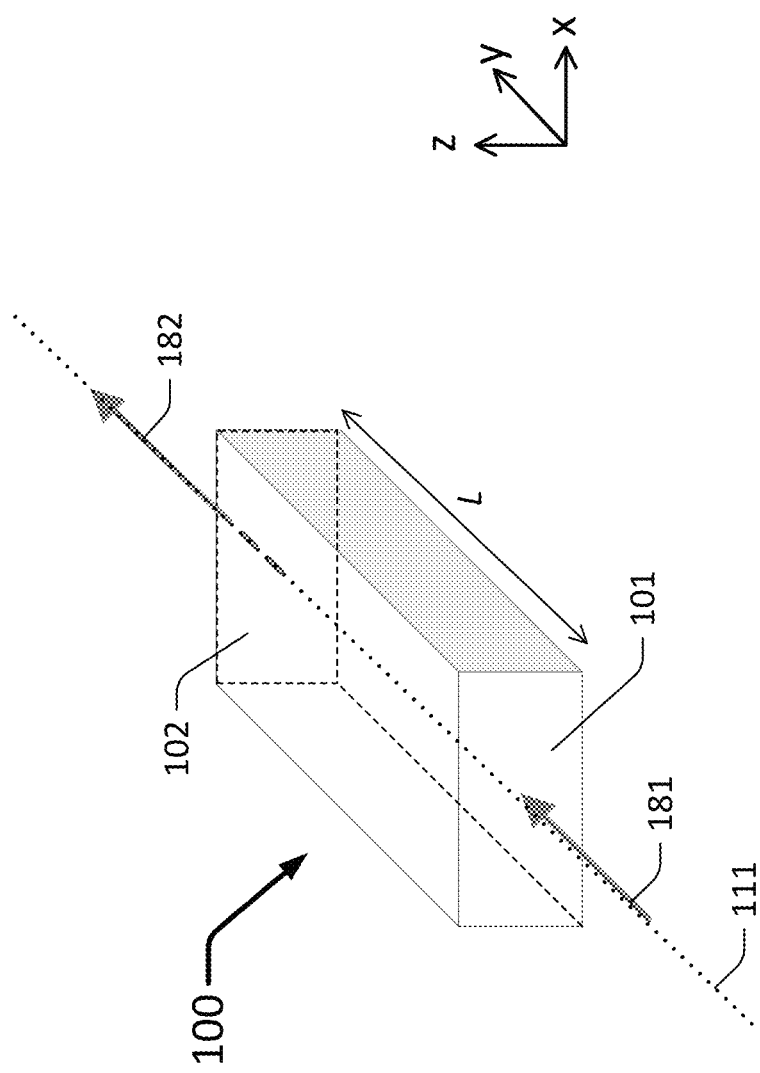
FIG. 1 is a perspective diagram of a monolithic phase shifter in accordance with an embodiment of the present disclosure.

To realize a phase shifter having a suspended structure, one may start on a basis of a phase shifter that is without a suspended structure. FIG. 1 illustrates a perspective view of a monolithic phase shifter 100 that does not have a suspended structure. Phase shifter 100 may be fabricated on a semiconductor substrate, such as a silicon-on-insulator (SOI) substrate. A SOI substrate is composed of a silicon substrate, a top silicon layer having a thickness significantly smaller than that of the silicon substrate, and a buried oxide (BOX) layer sandwiched between the thicker silicon substrate and the top silicon layer. The thicker silicon substrate is sometimes called "bulk silicon substrate". In an event that phase shifter 100 is manufactured using a SOI substrate, the active region of phase shifter 100 (i.e., the portion of phase shifter 100 that actually contributes to introducing a phase shift) is usually made out of the top silicon layer that is disposed on one side of the BOX layer. The bulk silicon substrate, disposed on the other side of the BOX layer, simply functions to provide the mechanical strength needed to carry the BOX layer and the top silicon layer.

As shown in FIG. 1, phase shifter 100 is primarily of a shape of a rectangular slab. Phase shifter 100 is configured to receive an input signal 181 on one end 101 of the slab (i.e., an input terminal) and emit an output signal 182 on the other end 102 of the slab (i.e., an output terminal). Input signal 181 and output signal 182 represent the optical wave that physically propagate through phase shifter 100. Input signal 181 and output signal 182 are substantially in line with each other along a primary axis 111 of phase shifter 100. A main propagation direction may be defined for phase shifter 100 such that the main propagation direction is parallel with primary axis 111 and pointing from the input terminal to the output terminal. Referring to the Cartesian coordinates of FIG. 1, primary axis 111 is parallel with the y-axis. Output signal 182 has substantially same amplitude and frequency as input signal 181, but with a different phase component. Namely, there is a phase shift introduced by phase shifter 100 as input signal 181 enters at end 101, propagates through phase shifter 100, and exits at end 102 as output signal 182. The amount of the phase shift may be determined by an electrical voltage applied to phase shifter 100 via a pair of electrodes thereof (electrodes not shown in FIG. 1). Specifically, the applied electrical voltage may change the refractive index of phase shifter 100, thereby generating a phase difference that exists between input signal 181 and output signal 182, and hence the "phase shift".

Figure 2:
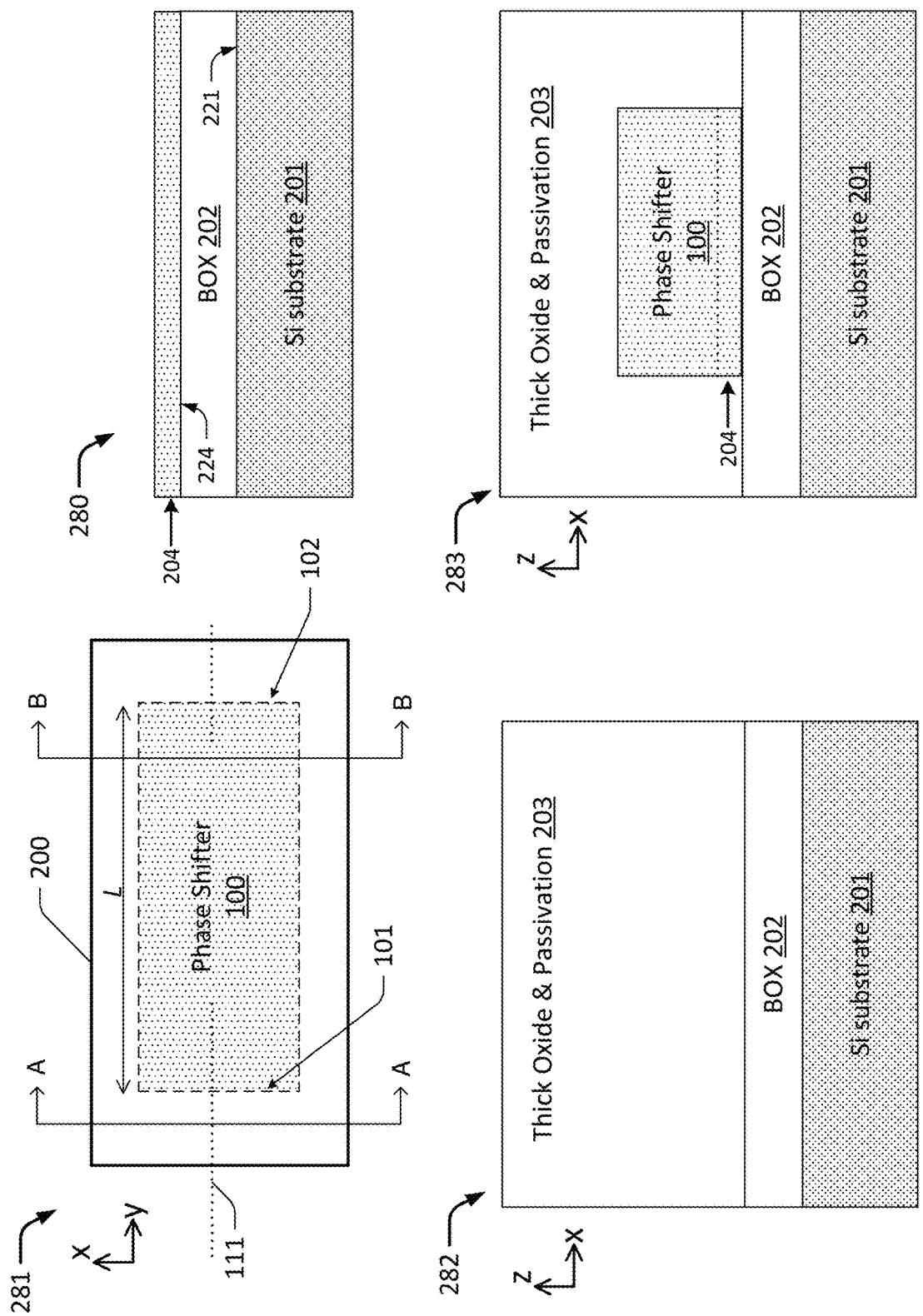
FIG. 2 illustrates a top view and two cross-sectional views the phase shifter of FIG. 1.

FIG. 2 illustrates a top view 281 of a SOI substrate 200 having phase shifter 100 fabricated thereon, as well as cross-sectional views 282 and 283 of SOI substrate 200 along line A-A and line B-B of FIG. 2, respectively. Additionally, FIG. 2 also illustrate a cross sectional view 280 of SOI substrate 200 before phase shifter 100 is fabricated thereon. Cross sectional view 280 may illustrate a cross section along either line A-A or line B-B of FIG. 2, as the cross section of SOI substrate 200 is the same at line A-A and line B-B before phase shifter 100 is fabricated. As shown in cross sectional view 280, before phase shifter 100 is fabricated, SOI substrate 200 comprises three different layers of material, with a BOX layer 202 sandwiched between a bulk silicon substrate 201 and a top silicon layer 204. Namely, top silicon layer 204 and bulk silicon substrate 201 are disposed respectively on two opposite sides BOX layer 202. BOX layer 202 has two opposing surfaces: an upper surface 224 and a lower surface 221. Top silicon layer 204 meets BOX layer 202 at upper surface 224, whereas silicon substrate 201 meets BOX layer 202 at lower surface 221. As described above, top silicon layer 204 typically has a thickness in z-direction that is significantly smaller than that of bulk silicon substrate 201. Moreover, the active region/portion of phase shifter 100 is made in top silicon layer 204.

A primary plane may be defined for SOI substrate 200 as a plane parallel to the x-y plane of the Cartesian coordinates of FIG. 1 or FIG. 2. Namely, top view 281 is in parallel with the x-y plane. Moreover, each of cross-sectional views 280, 282 and 283 is parallel to the x-z plane of the Cartesian coordinates. As shown in cross-sectional view 282, a cross section of SOI substrate 200 at line A-A comprises a silicon substrate 201, a BOX layer 202 on top of silicon substrate 201, and a thick oxide/passivation layer 203 on top of BOX layer 202. Cross-sectional view 282 does not show any part of phase shifter 100. On the other hand, line B-B intersects phase shifter 100 in top view 281. Thus, a cross-sectional view of substrate 200 along line B-B would reveal at least a portion of phase shifter 100, as shown in cross-sectional view 283.

Figure 3:
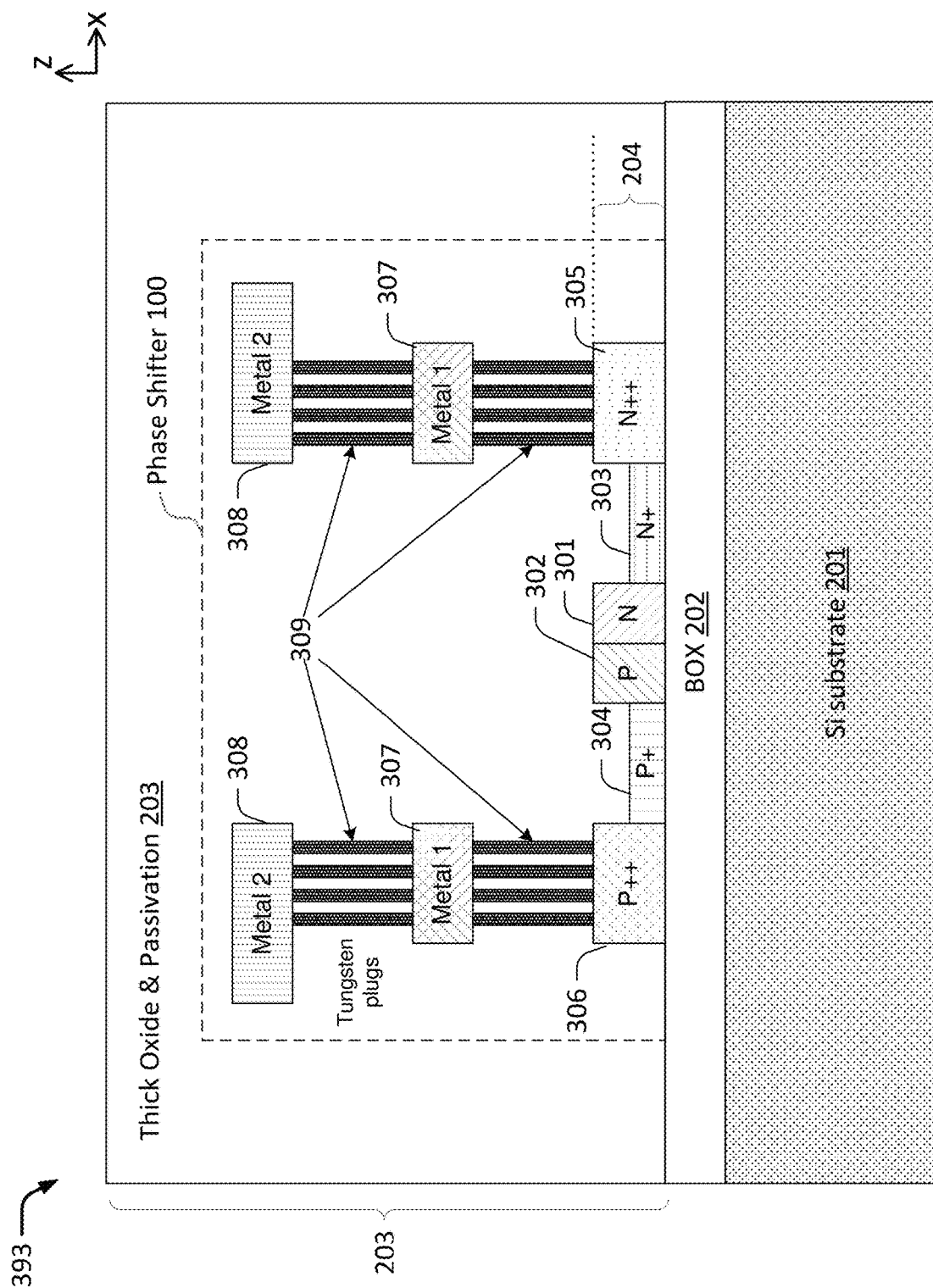
FIG. 3 illustrates a cross-sectional view of a phase shifter without a suspended structure.

FIG. 3 illustrates a cross-sectional view 393, which is a more detailed version of cross-sectional view 283. Specifically, various of dopant regions, silicide, and metallization that make up phase shifter 100 are shown, including N type doped silicon region 301, P type doped silicon region 302, N+ doped silicon region 303, P+ doped silicon region 304, N++ doped silicon region 305, P++ doped silicon region 306, metal one layer 307, and metal two layer 308. In addition, tungsten plugs 309 that provide electrical connections that couple metal one layer 307 to each of N++ doped silicon region 305, P++ doped silicon region 306, and metal two layer 308 are also shown in cross-sectional view 393. Metal two layer 308 may be used as electrodes via which a voltage may be applied to phase shifter 100 to produce a desired amount of phase shift.

On a strict sense, only N type doped silicon region 301 and P type doped silicon region 302 may be identified as the active region of a phase shifter. However, on a looser sense, other doped regions, including doped regions 303, 304, 305 and 306 may be identified as part of the active region.

Doped regions 301, 302, 303, 304, 305 and 306 are formed in top silicon layer 204 of the SOI substrate. Each of doped regions 301-306 may in general be a rectangular strip with a certain thickness. In some embodiments, N type doped silicon region 301 and P type doped silicon region 302 may have an equal dimension in y-direction. In some embodiments, the dimension of N type doped silicon region 301 and P type doped silicon region 302 in y-direction may define the length L of phase shifter 100, as shown in FIG. 1 and FIG. 2. In some embodiments, one or more of doped regions 303, 304, 305 and 306 may also have a dimension of L in y-direction.

As shown in FIG. 3, N type doped silicon region 301 and P type doped silicon region 302 may be disposed alongside and adjacent to one another. N+ doped silicon region 303 may be disposed alongside and adjacent to N type doped silicon region 301, opposing P type doped silicon region 302. Similarly, P+ doped silicon region 304 may be disposed alongside and adjacent to P type doped silicon region 302, opposing N type doped silicon region 301. In addition, N++ doped silicon region 305 may be disposed alongside and adjacent to N+ doped silicon region 303, opposing N type doped silicon region 301. Similarly, P++ doped silicon region 306 may be disposed alongside and adjacent to P+ doped silicon region 304, opposing P type doped silicon region 302. Doped regions 301-306 are on a same side of to BOX layer 202, as they are formed in top silicon layer 204, which in itself is adjacent to BOX layer 202.

Each of doped regions 301-306 may be formed by providing a specific level of N type or P type dopants in a specific region of top silicon layer 204. Moreover, each layer or doped region in FIG. 3 may have a preferred range of thickness in z-direction. In some embodiments, each of N type doped silicon region 301 and P type doped silicon region 302 may have a thickness in the range of 150-400 nanometers (nm), as well as a doping concentration in the range of 2e16-1e18 per cubic centimeter ($cm^{-3}$). In some embodiments, each of N+ doped silicon region 303 and P+ doped silicon region 304 may have a thickness in the range of 70-320 nm, as well as a doping concentration in the range of 1e18-5e18 $cm^{-3}$. In some embodiments, each of N++ doped silicon region 305 and P++ doped silicon region 306 may have a thickness in the range of 150-400 nm, as well as a doping concentration in the range of 5e18-2e20 $cm^{-3}$. Each of metal one layer 307 and metal two layer 308 may be made of electrically conductive metal, alloy or other material, such as aluminum-copper (Al—Cu) alloy. In some embodiments, metal one layer 307 may have a thickness in the range of 0.3-0.8 micrometers (um), whereas metal two layer 308 may have a thickness in the range of 1.5-3 um. In some embodiments, BOX layer 202 may have a thickness in the range of 2-4 um.

Figure 4A:
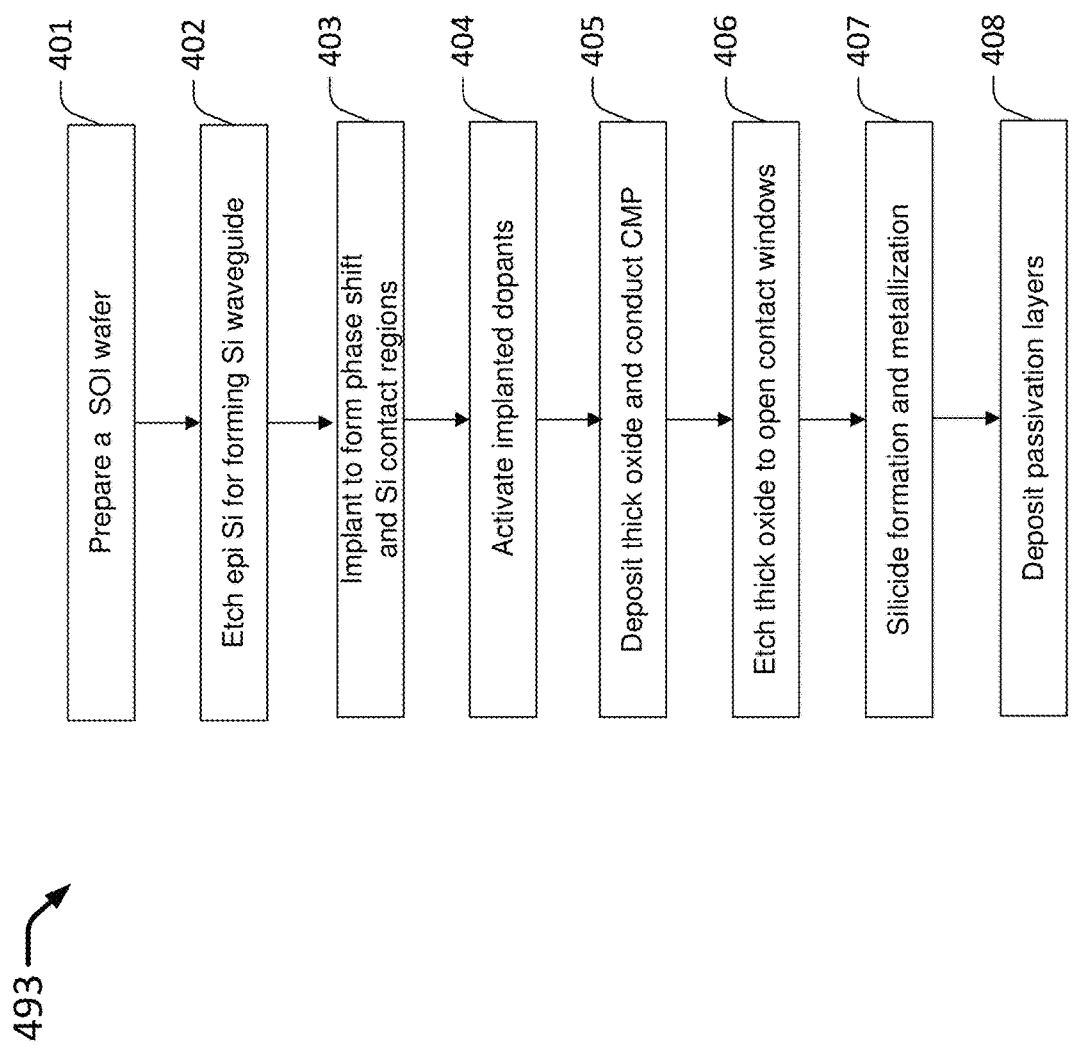
FIGS. 4A, 4B and 4C each shows a flow chart for manufacturing a monolithic phase shifter in accordance with an embodiment of the present disclosure.

FIG. 4A illustrates a flow chart of an example process 493 for manufacturing phase shifter 100 having a cross-sectional view 393 of FIG. 3. Process 493 may include one or more operations, actions, or functions shown as blocks such as 401, 402, 403, 404, 405, 406, 407 and 408 of FIG. 4A. Although illustrated as discrete blocks, various blocks of process 493 may be divided into additional blocks, combined into fewer blocks, or eliminated, depending on the desired implementation. Process 493 may begin at block 401.

At block 401, process 493 may involve preparing an SOI wafer or substrate, such as SOI substrate 200, by chemically and mechanically cleaning upper and lower surfaces the SOI wafer to remove any impurity or foreign substance that may otherwise impede or affect the following processing steps. Process 493 may proceed from block 401 to block 402.

At block 402, process 493 may involve etching a top silicon layer of the SOI wafer (e.g., top silicon layer 204 of FIG. 2 and FIG. 3) to form one or more silicon waveguides. The silicon waveguides may be used to couple optical signal, such as input signal 181 and output signal 182, into and out of phase shifter 100. Process 493 may proceed from block 402 to block 403.

At block 403, process 493 may involve implanting N type and P type dopants at various doping concentrations to form phase shift regions and silicon contact regions, such as doped regions 301-306. Process 493 may proceed from block 403 to block 404.

At block 404, process 493 may involve activating, via a thermal process such as rapid thermal processing (RTP), the dopants implanted in block 403. Process 493 may proceed from block 404 to block 405.

At block 405, process 493 may involve depositing a layer of thick oxide over the phase shift regions and silicon contact regions, such as thick oxide 203 in FIG. 2 and FIG. 3. In addition, process 493 may involve conducting a chemical-mechanical polishing (CMP) process to bring down the deposited thick oxide to a desired thickness. Process 493 may proceed from block 405 to block 406.

At block 406, process 493 may involve selectively etching certain portions of the thick oxide to create contact windows therein that are aligned with N++ doped region 305 and P++ doped region 306. Through the contact windows, at least a portion of each of N++ doped region 305 and P++ doped region 306 is exposed. Process 493 may proceed from block 406 to block 407.

At block 407, process 493 may involve forming silicide and metallization needed for realizing electrical interconnections within phase shifter 100, or between phase shifter 100 and other components/terminals. For example, metal one layer 307, metal two layer 308, and tungsten plugs 309 may be deposited or otherwise formed in the contact windows that are etched out in block 406 to achieve the electrical connections. Process 493 may proceed from block 407 to block 408.

At block 408, process 493 may involve depositing one or more layers of passivation material on the side of the SOI substrate opposing the bulk silicon substrate to protect the fabricated phase shifter.

Figure 4B:
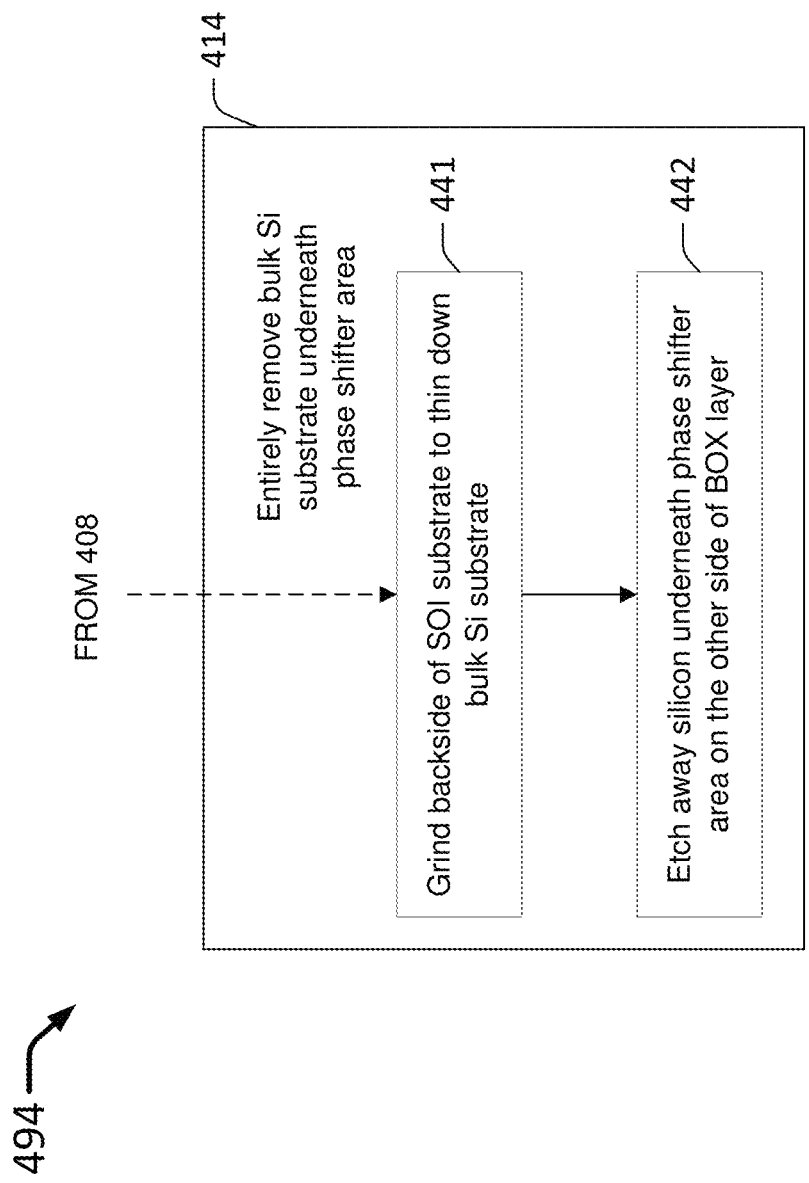
Figure 4C:
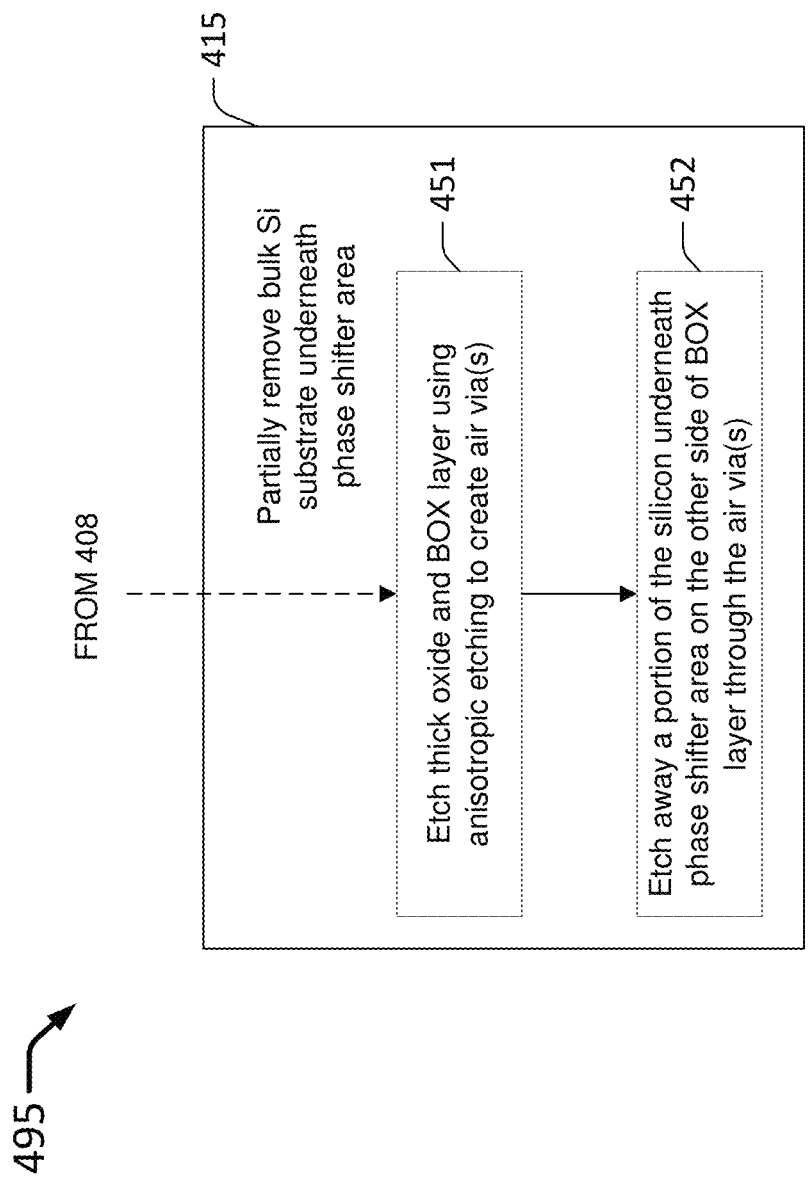

As mentioned above, a phase shifter without a suspended structure may be further processed to form a suspended structure, which possesses an advantage of reducing RF loss of the phase shifter. FIG. 4B illustrates a flow chart of an example process 494 for manufacturing a phase shifter having a suspended structure of a first kind as shown in cross-sectional view 584 of FIG. 5. FIG. 4C illustrates a flow chart of an example process 495 for manufacturing a phase shifter having a suspended structure of a second kind as shown in cross-sectional view 585 of FIG. 5. The resulted suspended structure, either the first or the second kind, provides the benefit of reducing RF loss in the phase shifter, especially in the high signal frequency range. Compared with process 493, each of process 494 and process 495 has an additional block (i.e., block 414 and block 415, respectively) following block 408. At the additional block, process 494 and 495 may involve creating the suspended structure by removing at least a portion of the bulk silicon substrate of the SOI substrate. As shown in cross-sectional view 584, the suspended structure of the first kind has phase shifter 100 suspended on BOX layer 202 over a void 524 that is adjacent to lower surface 221 of BOX layer 202. Moreover, void 524 is achieved by completely removing the silicon underneath phase shifter 100. Likewise, in the suspended structure of the second kind as shown in cross-sectional view 585, phase shifter 100 is suspended on BOX layer 202 over a void 525 that is also adjacent to lower surface 221 of BOX layer 202 What is different from void 524 is, void 525 is achieved by partially, instead of completely, removing the silicon underneath phase shifter 100. Specifically, air via 511 and air via 512 are utilized to access and remove the silicon material that was originally in void 525. Each of air via 511 and air via 512 may penetrate through BOX layer 202 and thus form a continuous passage from void 525 to an external of phase shifter 100.

Two air vias 512 are utilized to form void 525, and the two vias are placed on opposite sides of phase shifter 101 to achieve a more even excavation from both sides when forming void 525. In some embodiments, especially when the SOI substrate is already tight in space, only one air via may be allocated for each void to be formed. Another thing worth noting is that by creating air vias 511 and 512, some of the materials on the sides of phase shifter 100 are also removed.

In some embodiments, each of void 524 and void 525 mat have a projected area on the x-y plane substantially the same size as that of phase shifter 100 projected on the x-y plane. In some embodiments, the projected area of each of void 524 and void 525 may be larger or smaller than that of phase shifter 100 projected on the x-y plane. That is, each of void 524 and void 525 may be opposing an imaginary aggregated area in top silicon layer 204, whereas the aggregated area may encompass some, part or all of doped regions 301-306.

A feature that is distinctive to differentiate void 524 from void 525 is, for void 524, there exists a line of sight (LOS) between lower surface 221 of BOX layer 202 and the external of the phase shifter, whereas for void 525 there is no such LOS. Namely, void 524 is positioned to expose at least a portion of surface 221 to the external of the phase shifter through a LOS, such as LOS 564 of FIG. 5. Void 525, however, does not have such a LOS through which at least a portion of surface 221 may be exposed.

Figure 6:
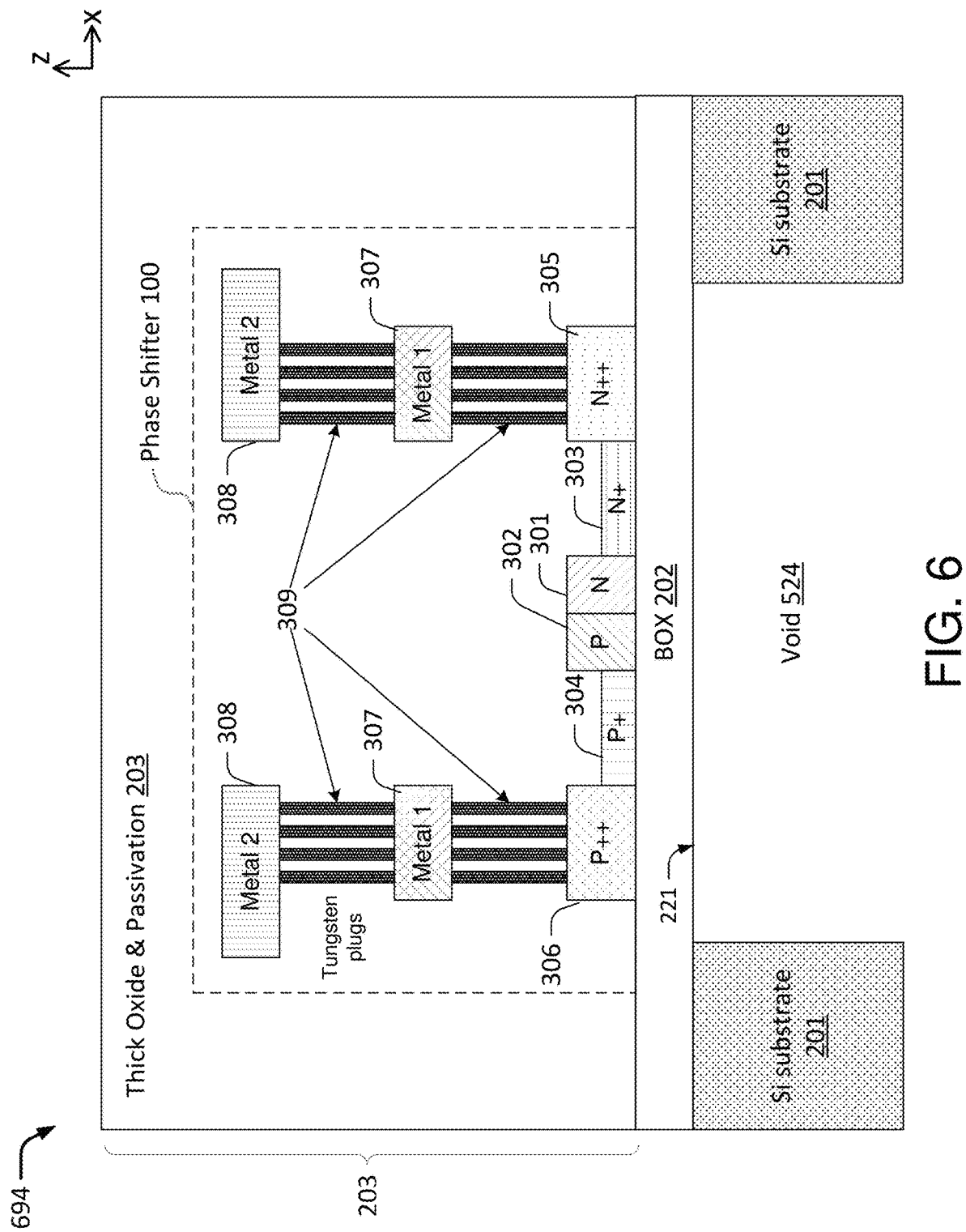
FIG. 6 and FIG. 7 each illustrates details of an embodiment of a monolithic phase shifter having a suspended structure in accordance with an embodiment of the present disclosure.
Figure 7:
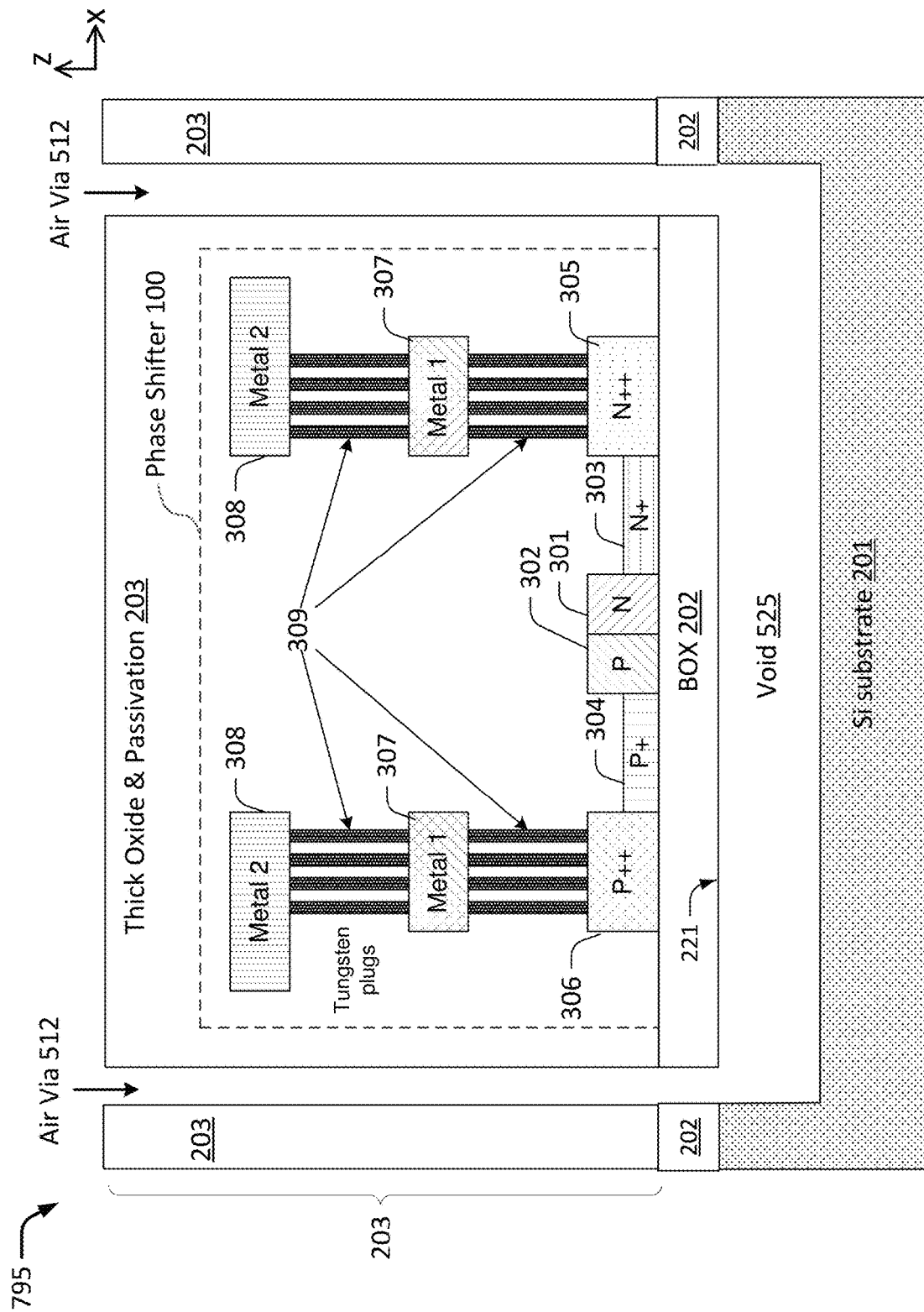

FIG. 6 illustrates a cross-sectional view 694 of a phase shifter having a suspended structure of the first kind. Cross-sectional view 694 is similar to cross-sectional view 584, only to show further details of various doped regions 301-306, as well as metallization including metal one layer 307, metal two layer 308 and tungsten plugs 309. Likewise, FIG. 7 illustrates a cross-sectional view 795 of a phase shifter having a suspended structure of the second kind. Cross-sectional view 795 is similar to cross-sectional view 585, only to show further details of various doped regions 301-306, as well as metallization including metal one layer 307, metal two layer 308 and tungsten plugs 309. Cross-sectional views 584, 585, 694 and 795 may be utilized to explain process 494 and 495.

Process 494 may be used to fabricate a phase shifter having a suspended structure of the first kind, such as one shown in cross-sectional views 584 or 694. Compared with process 493, process 494 performs additional processing steps following the fabrication of a phase shifter without a suspended structure using process 493. The additional processing is represented by block 414 and aims to convert a phase shifter having a cross-sectional view 283 or 393 to a phase shifter having a cross-sectional view 584 or 694. Block 414 of process 494 may follow block 408 of process 493.

At block 414, process 494 may involve removing an entirety of the bulk silicon substrate 201 that is underneath an area of phase shifter 100, resulting in void 524. Block 414 may include sub-blocks 441 and 442. Block 414 may begin at sub-block 441.

At sub-block 441, process 494 may involve grinding the backside of the SOI substrate (i.e., the side having bulk silicon substrate 201) to thin down or otherwise reduce the thickness of bulk silicon substrate 201 to a predetermined thickness. Process 494 may proceed from sub-block 441 to sub-block 442.

At sub-block 442, process 494 may involve removing silicon material in bulk silicon substrate 201 underneath the area of phase shifter 100 to form void 524. The removal of the silicon material may be conducted by dry etching, wet etching, or a combination of both. After sub-block 442 is performed, BOX layer 202 is essentially exposed to the external on the backside of the SOI substrate.

Process 495 may be used to fabricate a phase shifter having a suspended structure of the second kind, such as one shown in cross-sectional views 585 or 795. Compared with process 493, process 495 performs additional processing steps following the fabrication of a phase shifter without a suspended structure using process 493. The additional processing is represented by block 415 and aims to convert a phase shifter having a cross-sectional view 283 or 393 to a phase shifter having a cross-sectional view 585 or 795. Block 415 of process 495 may follow block 408 of process 493.

At block 415, process 495 may involve removing a portion but not all of the bulk silicon substrate 201 that is underneath an area of phase shifter 100, resulting in void 525. Block 415 may include sub-blocks 451 and 452. Block 415 may begin at sub-block 451.

At sub-block 451, process 495 may involve creating one or more air vias (e.g., air vias 512) in thick oxide 203. In particular, the air vias may be created using anisotropic dry etching that is able to form physical features having a high aspect ratio. The dry etching may further extend the air vias to penetrate through BOX layer 202 and reach bulk silicon substrate 201. Process 495 may proceed from sub-block 451 to sub-block 452.

At sub-block 452, process 495 may involve removing a portion of silicon material in bulk silicon substrate 201 underneath the area of phase shifter 100 to form void 524 that extends below BOX layer 202. The removal of the silicon material may be conducted by wet etching, using air vias 512 as a conduit or a continuous passage to reach bulk silicon substrate 201 below BOX layer 202. The silicon material removed by the etchant may be removed through air vias 512. After sub-block 452 is performed, void 524 is formed underneath BOX layer 202, as shown in cross-sectional views 585 and 795.

Figure 8:
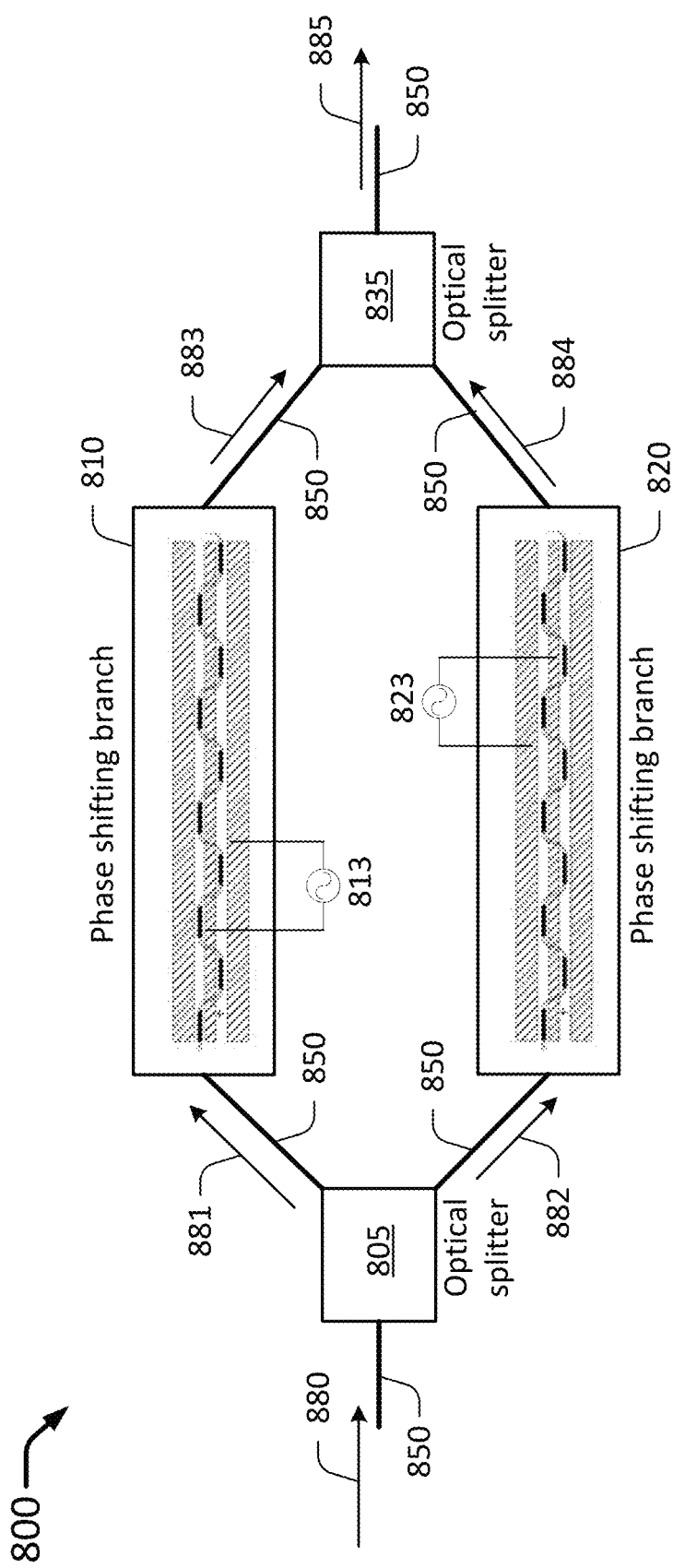
FIG. 8 illustrates a monolithic electro-optical (E-O) modulator in accordance with an embodiment of the present disclosure.

FIG. 8 illustrates a schematic diagram of a monolithic E-O modulator 800 that employs one or more of the phase shifters having suspended structures described above. Modulator 800 may include an input optical splitter 805, an output optical splitter 835, as well as two phase shifting (PS) branches 810 and 820. Waveguides 850 are used to couple an optical wave from one component of modulator 800 to another. Modulator 800 may receive a CW optical wave 880 as an input signal. Input optical splitter 805 may be used to split the input signal 880 into a first branch signal 881 and a second branch signal 882. PS branch 810 may receive first branch signal 881 at its input and emits a shifted signal 883 at its output. Likewise, PS branch 820 may receive second branch signal 882 at its input and emits a shifted signal 884 at its output.

Each of PS branch 810 and PS branch 820 may include one phase shifter, or two or more phase shifters connected in series. Each of the phase shifters of PS branch 810 and PS branch 820 may be embodied by a phase shifter having a suspended structure, such as those shown in FIGS. 5-7. Each of PS branch 810 and PS branch 820 may also include a coplanar waveguide (CPW), through which a respective modulation voltage (i.e., electrical voltage 813 or 823) may apply to the corresponding PS branch. Through phase shifters of PS branch 810, electrical voltage 813 may induce a phase shift in shifted signal 883 as compared to first branch signal 881. Likewise, through phase shifters of PS branch 820, electrical voltage 823 may induce a phase shift in shifted signal 884 as compared to second branch signal 882. In some embodiments, PS branches 810 and 820 are intended to be "matched". That is, PS branches 810 and 820 are desired to be identical in various physical aspects. In some embodiments, only one of electrical voltages 813 and 823 may carry a time-varying modulation signal, whereas the other electrical voltage may not be time varying. In some embodiments, both of electrical voltages 813 and 823 may be time-varying in a mutually related fashion.

Finally, output optical splitter 835 may be used to combine shifted signals 883 and 884 into an output signal 885.

Figure 9:
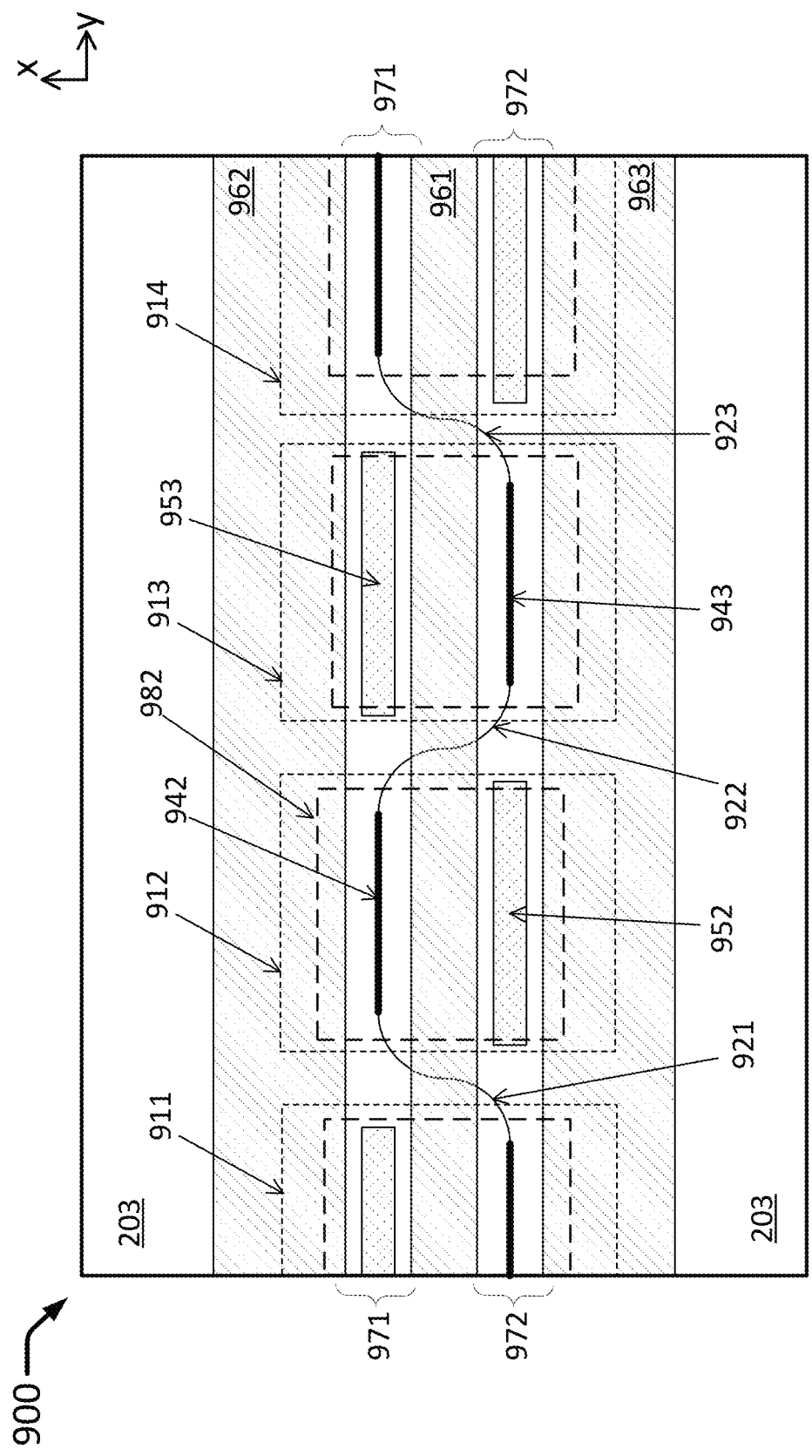
FIG. 9 illustrates a few phase shifters in serial connection and used in the E-O modulator of FIG. 8.

FIG. 9 shows a partial top view 900 of a PS branch 810 or 820 of FIG. 8. Similar to top view 281 of FIG. 2, partial top view 900 is in the x-y plane in view of the Cartesian coordinates of FIG. 1. Partial top view 900 shows four phase shifters 911, 912, 913 and 914 connecting in series using waveguides 921, 922 and 923. Specifically, waveguides 921, 922 and 923 couples the active regions of phase shifters 911-914. For example, waveguide 922 is used to couple active region 942 of phase shifter 912 to active region 943 of phase shifter 913. The primary axis of each of the four phase shifters 911-914 is along the y-direction.

Each of phase shifters 911-914 may be a phase shifter having a suspended structure of the second kind, similar to the phase shifter shown in cross-sectional view 585 or 795.

Figure 5:
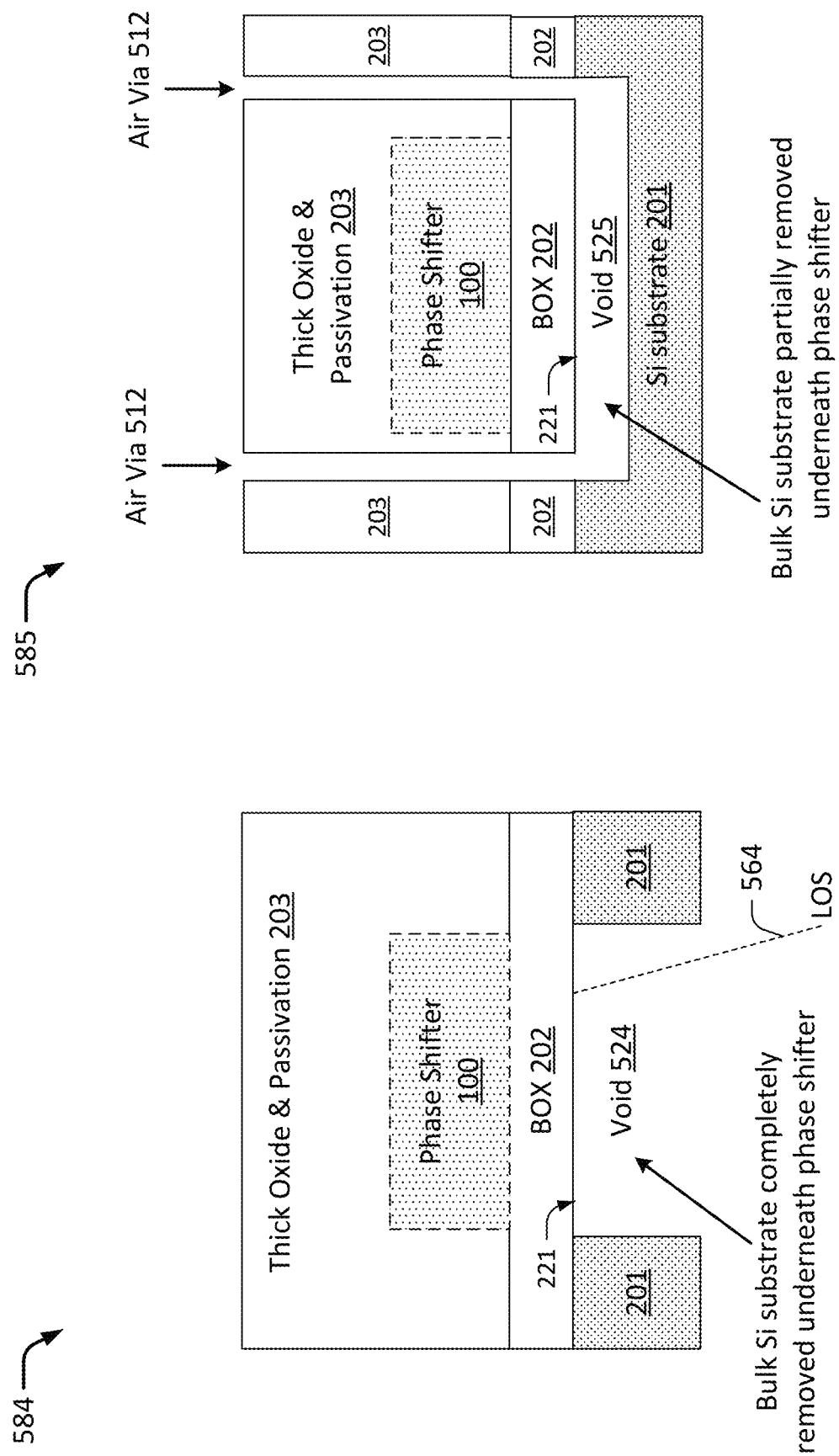
FIG. 5 illustrates cross-sectional views of two embodiments of a monolithic phase shifter having a suspended structure in accordance with an embodiment of the present disclosure.

As shown in FIG. 9, each of phase shifters 911-914 has one air via, through which a void similar to void 525 of FIG. 5 may be created using a processing step of block 415 of process 495. For example, phase shifter 912 includes an active region 942 and an air via 952. A void 982 underneath active region 942 may be created through air via 952, thereby reducing the RF loss of phase shifter 912.

Top view 900 also includes three electrodes 961, 962 and 963, which may run the entire length of PS branch 810 or 820 in the y-direction. Electrodes 961, 962 and 963 collectively form the CPW for receiving the modulation voltage (e.g., electrical voltage 813 or 823). Electrodes 962 and 963 are electrically coupled together to form a ground plane, and the modulation voltage is applied across electrode 961 and the ground plane. Two slots labeled 971 and 972 in FIG. 9 are naturally formed by the CPW, with slot 971 formed between electrodes 961 and 962, and slot 972 formed between electrodes 961 and 963. As shown in top view 900, for each of phase shifters 911-914, the active region is located in one slot, and the air via is located in the other slot. For example, for phase shifter 912, active region 942 is located in slot 971, and air via 952 is located in slot 972. Moreover, the location of the active region and the location of the air via may be swapped in an adjacent phase shifter. For example, for phase shifter 913 that is next to phase shifter 912, active region 943 is located in slot 972, and air via 953 is located in slot 971.

As mentioned above, suspended structures, regardless of the first kind or the second kind, are advantageous in reducing RF loss of phase shifters and enhancing the high-frequency performance of an E-O modulator employing the phase shifters, thereby improving the operating bandwidth of the E-O modulator. Meanwhile, the void used to create the suspended structure may be tailored to tweak or otherwise fine-tune the microwave refractive index of the active region of a phase shifter, a PS branch, or an E-O modulator. When the microwave refractive index of the active region is closer to the optical waveguide effective group refractive index of the phase shifter, velocity mismatch in the system is reduced, thereby also improving the operating bandwidth of the system. For example, for contemporary optical systems using PICs, it would be ideal to fine-tune the microwave refractive index of the active region to be in the vicinity of 3.8 using the suspended structure.

Additional Notes

Although some embodiments are disclosed above, they are not intended to limit the scope of the present disclosure. It will be apparent to those skilled in the art that various modifications and variations can be made to the disclosed embodiments of the present disclosure without departing from the scope or spirit of the present disclosure. In view of the foregoing, the scope of the present disclosure shall be defined by the following claims and their equivalents.

What is claimed is:
1. A monolithic phase shifter, comprising:
a silicon-on-insulator (SOI) substrate comprising a bulk silicon substrate, a buried oxide (BOX) layer disposed on top of the bulk silicon substrate, and a top silicon layer disposed on top of the BOX layer;
a N type doped region formed in the top silicon layer;
a P type doped region formed in the top silicon layer, the P type doped region disposed adjacent to the N type doped region along a main propagation direction of the monolithic phase shifter;

a N+ doped region formed in the top silicon layer, the N+ doped region disposed adjacent to the N type doped region and opposing the P type doped silicon region;

a P+ doped region formed in the top silicon layer, the P+ doped region disposed adjacent to the P type doped region and opposing the N type doped silicon region;

a N++ doped region formed in the top silicon layer, the N++ doped region disposed adjacent to the N+ doped region and opposing the N type doped silicon region;

a P++ doped region formed in the top silicon layer, the P++ doped region disposed adjacent to the P+ doped region and opposing the P type doped silicon region; and a void formed in the bulk silicon substrate, the void adjacent to a surface of the BOX layer away from the top silicon layer and opposing an aggregated area in the top silicon layer, the aggregated area encompassing at least a portion of the N type doped region, a portion of the N type doped region, a portion of the N+ doped region, a portion of the P+ doped region, a portion of the N++ doped region or a portion of the P++ doped region.

2. The monolithic phase shifter of claim 1, wherein the void is positioned to expose at least a portion of the surface to an external of the monolithic phase shifter through a line of sight (LOS).

3. The monolithic phase shifter of claim 1, wherein the void is positioned such that no part of the surface is exposed to an external of the monolithic phase shifter through a line of sight (LOS).

4. The monolithic phase shifter of claim 3, further comprising:

at least one air via connected to the void, the at least one air via penetrating through the BOX layer and forming a continuous passage from the void to an external of the monolithic phase shifter.

5. The monolithic phase shifter of claim 1, wherein the BOX layer has a thickness in a range of 2-4 micrometers.

6. The monolithic phase shifter of claim 1, wherein each of the N type doped region and the P type doped region has a thickness in a range of 150-400 nanometers and a doping concentration in a range of 2e16-1e18 per cubic centimeter.

7. The monolithic phase shifter of claim 1, wherein each of the N+ doped region and the P+ doped region has a thickness in a range of 70-320 nanometers and a doping concentration in a range of 1e18-5e18 per cubic centimeter.

8. The monolithic phase shifter of claim 1, wherein each of the N++ doped region and the P++ doped region has a thickness in a range of 150-400 nanometers and a doping concentration in a range of 5e18-2e20 per cubic centimeter.

9. The monolithic phase shifter of claim 1, further comprising:

a first electrode electrically coupled to the P++ doped region; and a second electrode electrically coupled to the N++ doped region, wherein the first and second electrodes are configured to receive an electrical voltage applied therebetween to cause a phase shift to a signal propagating through the monolithic phase shifter.

10. An electro-optical (E-O) modulator, comprising:

an input optical splitter configured to split an input signal into a first branch signal and a second branch signal;

a first phase shifting (PS) branch comprising two or more monolithic phase shifters connected in series, the first PS branch configured to receive the first branch signal as an input and emits a first shifted signal as an output;

a second phase shifting (PS) branch comprising two or more monolithic phase shifters connected in series, the second PS branch configured to receive the second branch signal as an input and emits a second shifted signal as an output;

an output optical splitter configured to combine the first and second shifted signals into an output signal, wherein each of the first and second PS branches further comprises a coplanar waveguide (CPW) configured to receive a respective electrical voltage as a modulation signal, wherein at least one monolithic phase shifter of the two or more monolithic phase shifters of the first or second PS branch comprises a suspended structure, and wherein the suspended structure comprises a void formed in a bulk silicon substrate of a silicon-on-insulator (SOI) substrate carrying the at least one monolithic phase shifter.

11. The E-O modulator of claim 10, wherein the at least one monolithic phase shifter having the suspended structure comprises:

the SOI substrate comprising the bulk silicon substrate, a buried oxide (BOX) layer disposed on top of the bulk silicon substrate, and a top silicon layer disposed on top of the BOX layer;

a N type doped region formed in the top silicon layer;

a P type doped region formed in the top silicon layer, the P type doped region disposed adjacent to the N type doped region along a main propagation direction of the at least one monolithic phase shifter;

a N+ doped region formed in the top silicon layer, the N+ doped region disposed adjacent to the N type doped region and opposing the P type doped silicon region;

a P+ doped region formed in the top silicon layer, the P+ doped region disposed adjacent to the P type doped region and opposing the N type doped silicon region;

a N++ doped region formed in the top silicon layer, the N++ doped region disposed adjacent to the N+ doped region and opposing the N type doped silicon region; and a P++ doped region formed in the top silicon layer, the P++ doped region disposed adjacent to the P+ doped region and opposing the P type doped silicon region, wherein the void is formed in the bulk silicon substrate, the void adjacent to a surface of the BOX layer away from the top silicon layer and opposing an aggregated area in the top silicon layer, the aggregated area encompassing at least a portion of the N type doped region, a portion of the N type doped region, a portion of the N+ doped region, a portion of the P+ doped region, a portion of the N++ doped region or a portion of the P++ doped region.

12. The E-O modulator of claim 11, wherein the void is positioned to expose at least a portion of the surface to an external of the at least one monolithic phase shifter through a line of sight (LOS).

13. The E-O modulator of claim 11, wherein the void is positioned such that no part of the surface is exposed to an external of the at least one monolithic phase shifter through a line of sight (LOS).

14. The E-O modulator of claim 13, further comprising:

an air via connected to the void, the air via penetrating through the BOX layer and forming a continuous passage from the void to an external of the at least one monolithic phase shifter, wherein an active region of the at least one monolithic phase shifter is located within a first slot of the CPW, and wherein the air via is located within a second slot of the CPW.

15. The E-O modulator of claim 11, wherein the BOX layer has a thickness in a range of 2-4 micrometers.

16. The E-O modulator of claim 11, wherein each of the N type doped region and the P type doped region has a thickness in a range of 150-400 nanometers and a doping concentration in a range of 2e16-1e18 per cubic centimeter.

17. The E-O modulator of claim 11, wherein each of the N+ doped region and the P+ doped region has a thickness in a range of 70-320 nanometers and a doping concentration in a range of 1e18-5e18 per cubic centimeter.

18. The E-O modulator of claim 11, wherein each of the N++ doped region and the P++ doped region has a thickness in a range of 150-400 nanometers and a doping concentration in a range of 5e18-2e20 per cubic centimeter.

19. The E-O modulator of claim 11, further comprising:
a first electrode electrically coupled to the P++ doped region; and
a second electrode electrically coupled to the N++ doped region,
wherein the first and second electrodes are configured to receive an electrical voltage applied therebetween to cause a phase shift to a signal propagating through the at least one monolithic phase shifter.

20. The E-O modulator of claim 19, wherein:
each of the first and second electrodes comprises a first layer of metal and a second layer of metal,
each of the first and second layers of metal comprises an aluminum-copper (Al—Cu) alloy,
the first layer of metal has a thickness in a range of 0.3-0.8 micrometers, and
the second layer of metal has a thickness in a range of 1.5-3 micrometers.

* * * * *